(12) United States Patent
Menjak et al.

(10) Patent No.: US 6,938,720 B2
(45) Date of Patent: Sep. 6, 2005

(54) STEERING INPUT DEVICES FOR STEER-BY-WIRE SYSTEMS

(75) Inventors: Ratko Menjak, Frankenmuth, MI (US); Zdravko Menjak, Troy, MI (US); James Myrl Card, Lighthouse Point, FL (US)

(73) Assignee: Delphi Technologies, Inc., Troy, MI (US)

( * ) Notice: Subject to any disclaimer, the term of this patent is extended or adjusted under 35 U.S.C. 154(b) by 117 days.

(21) Appl. No.: 10/143,182

(22) Filed: May 9, 2002

(65) Prior Publication Data

US 2003/0209381 A1 Nov. 13, 2003

(51) Int. Cl.[7] ................................................. B62D 5/00
(52) U.S. Cl. ....................... 180/402; 180/403; 180/421
(58) Field of Search .......................... 180/90, 222, 334, 180/402, 403, 422, 421; 280/752, 775

(56) References Cited

U.S. PATENT DOCUMENTS

| | | |
|---|---|---|
| 785,073 A | 3/1905 | Hussey |
| 1,187,482 A | 6/1916 | Appleby |
| 1,195,548 A | 8/1916 | Appleby |
| 1,476,347 A | 12/1923 | Martin |
| 1,597,815 A | 8/1926 | Myers |
| 1,714,155 A | 5/1929 | Binkley |
| 1,739,856 A | 12/1929 | Padgett |
| 1,809,765 A | 6/1931 | Van Horn |
| 2,206,431 A | 7/1940 | Schoenbechler |
| 2,207,736 A | 7/1940 | Hollingsworth |
| 2,909,941 A | 10/1959 | Guest |
| 2,954,708 A | 10/1960 | Huzzard |
| 3,176,537 A | 4/1965 | Zeigler |
| 4,399,882 A * | 8/1983 | O'Neill et al. .............. 180/6.48 |
| 4,568,102 A * | 2/1986 | Dauvergne ................... 280/752 |
| 4,659,244 A | 4/1987 | Malvy et al. .................. 403/24 |
| 4,756,552 A * | 7/1988 | Martinez et al. ............. 280/744 |
| 4,768,794 A * | 9/1988 | Bibollet ....................... 280/21.1 |
| 4,815,331 A * | 3/1989 | Land ............................. 74/494 |
| 4,881,389 A | 11/1989 | Alfon et al. ................... 70/209 |
| 4,887,484 A | 12/1989 | Peng ............................ 74/556 |
| 4,911,261 A * | 3/1990 | Conley ......................... 180/322 |
| 4,921,066 A * | 5/1990 | Conley ......................... 180/322 |
| 5,172,607 A | 12/1992 | Wu ............................... 74/552 |
| 5,307,892 A | 5/1994 | Phillips ...................... 180/79.1 |
| 5,383,344 A | 1/1995 | Zambell ........................ 70/209 |
| 5,461,361 A * | 10/1995 | Moore .......................... 340/461 |
| 5,493,935 A | 2/1996 | Lemmen ....................... 74/552 |

(Continued)

FOREIGN PATENT DOCUMENTS

| | | |
|---|---|---|
| DE | 886552 | 7/1949 |
| DE | 2901024 | 1/1979 |
| EP | 0 442 570 A1 | 9/1991 |
| EP | 0 726 193 A2 | 6/1996 |
| FR | 642.191 | 5/1928 |

*Primary Examiner*—Lesley D. Morris
*Assistant Examiner*—L. Lum
(74) *Attorney, Agent, or Firm*—Michael D. Smith (57) ABSTRACT

A steering input device for a steer-by-wire system is provided. The input device comprises a first shaft and a hand wheel. The first shaft is rotatably installed in a first housing. The hand wheel is connected to the first shaft such that the hand wheel and the first shaft drive one another. The hand wheel has a range of motion of between about ±45 degrees and about ±90 degrees. The hand wheel also has an outer dimension of about 12 inches. The range of motion and the outer dimension allow the steering input device to be installed in a vehicle in a non-conventional position relative to a twentieth century conventional position including at least one of the hand wheel extending from the first shaft extending along a length defining the vehicle on one of two sides thereof and the hand weel extending rearward in the vehicle farther than an instrument panel.

22 Claims, 3 Drawing Sheets

U.S. PATENT DOCUMENTS

| | | | |
|---|---|---|---|
| 5,732,789 A | * 3/1998 | Stephenson | 180/418 |
| 5,755,142 A | 5/1998 | Jacoby | 74/552 |
| 5,924,199 A | * 7/1999 | Conlee et al. | 29/894.1 |
| 6,070,686 A | * 6/2000 | Pollmann | 180/287 |
| 6,082,482 A | * 7/2000 | Kato et al. | 180/402 |
| 6,138,788 A | * 10/2000 | Bohner et al. | 180/405 |
| 6,152,248 A | * 11/2000 | Hidaka et al. | 180/6.38 |
| 6,176,341 B1 | * 1/2001 | Ansari | 180/402 |
| 6,227,327 B1 | * 5/2001 | Nigrin et al. | 180/402 |
| 6,263,997 B1 | * 7/2001 | Breuning et al. | 180/402 |
| 6,370,460 B1 | * 4/2002 | Kaufmann et al. | 701/41 |
| 6,446,747 B1 | * 9/2002 | Muller et al. | 180/334 |
| 6,471,242 B2 | * 10/2002 | Schneider | 280/732 |
| 6,481,525 B1 | * 11/2002 | Bloch et al. | 180/402 |
| 6,481,526 B1 | 11/2002 | Millsap et al. | |
| 6,491,128 B1 | * 12/2002 | Lehmann et al. | 180/315 |
| 6,494,287 B2 | * 12/2002 | Nigrin et al. | 180/402 |
| 6,505,703 B2 | * 1/2003 | Stout et al. | 180/446 |
| 6,547,029 B2 | * 4/2003 | Peppler et al. | 180/402 |
| 6,550,565 B2 | * 4/2003 | Thomas et al. | 180/402 |
| 6,557,662 B1 | * 5/2003 | Andonian et al. | 180/402 |
| 6,588,540 B2 | 7/2003 | Graber et al. | |

* cited by examiner

STEERING INPUT DEVICES FOR STEER-BY-WIRE SYSTEMS

TECHNICAL FIELD

This disclosure relates generally to steer-by-wire systems. More specifically, this disclosure relates to steering input devices for steer-by-wire systems.

BACKGROUND

A steering system is required to control the direction of travel of a vehicle. Typical mechanical steering systems include a mechanical linkage or a mechanical connection between a steering input device and a steering output device. The steering input device (e.g., a hand wheel and steering column) is connected to the steering output device (e.g., steerable road wheels) via an articulated mechanical linkage. Thus, movement of the hand wheel causes a corresponding movement of the steerable road wheels to control the vehicle's direction of travel.

These mechanical steering systems are being replaced and/or supplemented by electrically driven steering systems, commonly referred to as "steer-by-wire" systems. Steer-by-wire systems typically comprise a steering input device, a plurality of sensors, an electronic control unit, an actuator, and a steering output device. The position of the steering input device is detected by one of the sensors. The sensor converts the position into an electrical signal and provides the signal to the electronic control unit. Based upon the electrical signal, the electronic control unit operates the actuator to change the position of the steering output device. The actuator is, for example, an electric motor or hydraulic actuator. Thus, the electronic control unit controls the actuator to adjust the position of the steering output device based upon the position of the steering input device.

The migration to steer-by-wire systems has made new steering input devices possible. The migration to steer-by-wire systems has also made new safety devices possible, as well as allowing the implementation of current safety devices to be revisited.

Accordingly, there is a continuing need in steer-by-wire systems for improvements in the steering input devices and the available safety devices.

SUMMARY

A steering input device for a steer-by-wire system is provided. The input device comprises a first shaft and a hand wheel. The first shaft is rotatably installed in a first housing. The hand wheel is connected to the first shaft such that the hand wheel and the first shaft drive one another. The hand wheel has a range of motion of at least about ±45 degrees, but less than about ±90 degrees. The hand wheel also has an outer dimension of about 12 inches. The range of motion and the outer dimension allow the steering input device to be installed in a vehicle in a non-conventional position.

A steer-by-wire steering system for a vehicle is also provided. The system comprises a steering output device, an actuator, a steering input device, and an electronic control unit. The steering input device includes a hand wheel and a plurality of sensors. The electronic control unit electrically communicates with the actuator, the plurality of sensors, and the steering output device. The hand wheel is in a hand wheel area defined in an instrument panel of the vehicle such that the instrument panel extends rearward in the vehicle a distance equal to or farther than the hand wheel. The plurality of sensors generates signals representative of a position of the hand wheel. The electronic control unit being activates the actuator to control the position of the steering output device based upon the signals from the sensors.

A method of steering a vehicle is also provided. The method includes reaching into a hand wheel area defined within an instrument panel of the vehicle; grasping a hand wheel disposed in the hand wheel area; and moving the hand wheel to steer the vehicle. The hand wheel is disposed in the hand wheel area such that the instrument panel extends rearward in the vehicle a distance equal to or farther than the hand wheel.

The above-described and other features are appreciated and understood by those skilled in the art from the following detailed description, drawings, and appended claims.

DETAILED DESCRIPTION

An exemplary embodiment of a steering input device for a steer-by-wire system is provided. The steering input device comprises a hand wheel operatively connected to an upper shaft.

The steering input device is a fast acting input device having a compact hand wheel. Namely, the hand wheel has a small range of motion (e.g., angle of travel) and a small outer dimension as compared to prior steering devices.

The hand wheel has a range of motion (e.g., angle of travel) of at least about ±45 degrees. In contrast, prior steering devices require a range of motion of about 1.5 turns in either direction (e.g., ±540 degrees). The hand wheel has a compact outer dimension of about 12 inches. In contrast, hand wheels have an outer dimension of at least about 15 inches.

The outer dimension of the hand wheel is smaller than those of mechanically linked systems because the torque necessary to move the hand wheel is independent of the force necessary to move the road wheels. The range of motion of the hand wheel can also be smaller than those of mechanically linked systems because the range of motion of the hand wheel is independent of the range of motion of the road wheels.

The small dimensions and small angle of travel of the hand wheel allow design flexibility that has not been available in prior systems. For example, the exemplary embodiments of the steering input devices of the present disclosure allow for installation of the input device in one or more non-conventional positions in a vehicle, allow active and passive restraint devices to operate as intended, and provide a high range of visibility and accessibility to gauges and controls. The steering input device also includes several features working separately and/or in combination with one another to mimic certain responses as would be expected from a mechanically linked system.

Figure 1:
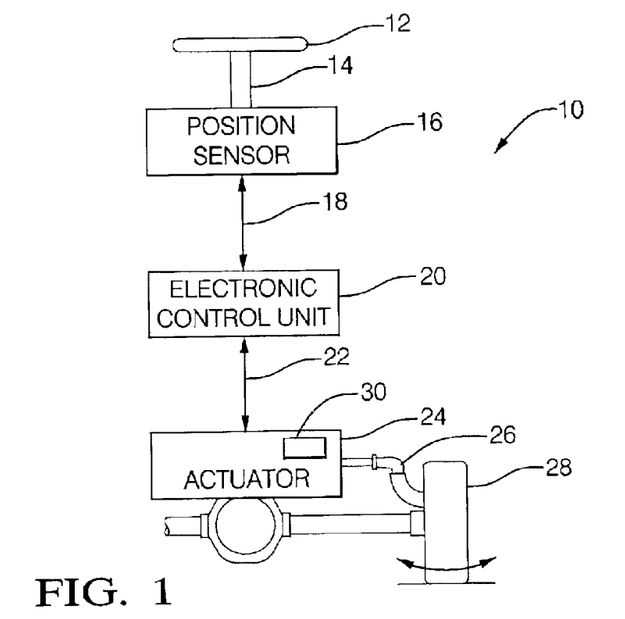
FIG. 1 is a schematic depiction of a steer-by-wire system.

Referring now to FIG. 1, a schematic depiction of a steer-by-wire system for a vehicle (not shown) is illustrated.

For purposes of clarity, the steer-by-wire system is described with respect to use in an automobile. Of course, the use of the steer-by-wire system with other types of vehicles is contemplated.

The steer-by-wire system receives operator input from a steering input device 10. The steering input device 10 comprises a hand wheel 12, an upper shaft 14, and a first sensor 16. The hand wheel 12 is positioned on the upper shaft 14 such that the operator can input changes to the steering input device 10 via the hand wheel. The first sensor 16 detects the position of the hand wheel 12 and/or the upper shaft 14.

The first sensor 16 is in electrical communication with an electronic control unit 20. The first sensor 16 provides a first signal 18 indicative of the position of the hand wheel 12 and/or the upper shaft 14. The first signal 18 is provided to the electronic control unit 20.

The control unit 20 includes a microprocessor and other assorted electronic components known in the field of electronic control for providing memory, input/output, and processing functions. The control unit 20 is also in electrical communication with a road wheel actuator 24 via a second signal 22. The road wheel actuator 24 is, for example, an electric motor or a hydraulic actuator. The actuator 24 is configured to control the position of a steering output device 28, such as a set of road wheels (only one shown), by means of a tie-rod 26.

The steer-by-wire system further comprises a second sensor 30. The second sensor 30 is configured to detect the position of the steering output device 28. In the illustrated embodiment, the second sensor 30 detects the position of the steering output device 28 via the actuator 24. Namely, the second sensor provides second signals 22 that are indicative of the position of the steering output device 28. The second sensor 30 is also in electrical communication with the control unit 20 to provide the second signals 22 to the control unit. The second signals 22 also include control signals configured to activate the actuator 24. Thus, the control unit 20 is configured to receive the second signals 22 from sensor 30 and provide the second signals to the actuator 24.

Thus, the electronic control unit 20 is configured to adjust the position of the steering output device 28 to correspond with the position of the steering input device 12. Specifically, the control unit 20 determines what second signals 22, if any, to send to the road wheel actuator 24, based on the first and second signals 18 and 22.

Figure 2:
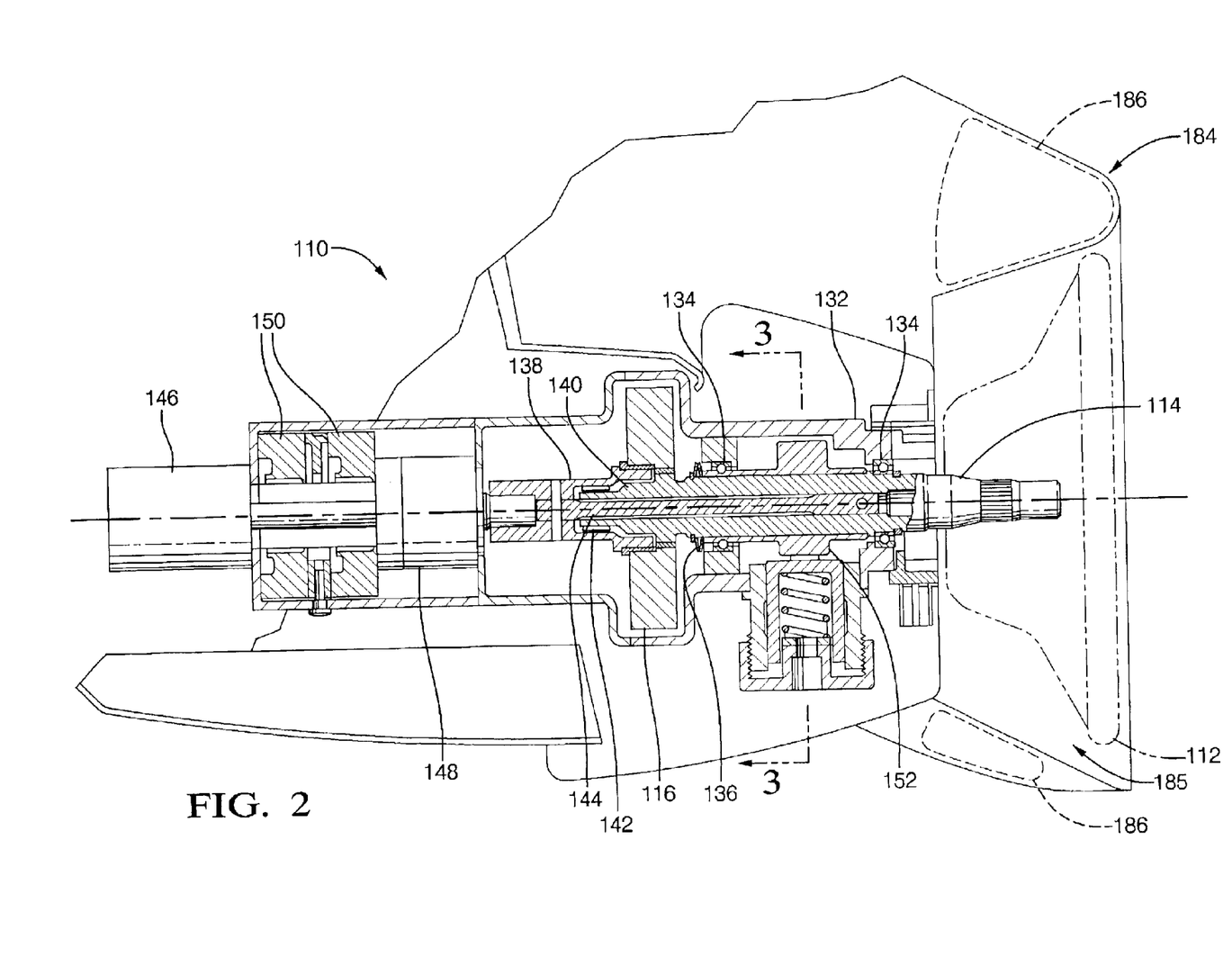
FIG. 2 is a sectional view of an exemplary embodiment of a steering input device.

Turning now to FIG. 2, an exemplary embodiment of a steering input device is illustrated having elements performing similar or analogous functions numbered in multiples of one hundred.

The steering input device 110 comprises a hand wheel 112 operatively connected to an upper shaft 114. The steering input device 110 is a fast acting input device. Namely, the hand wheel 112 has a range of motion or angle of travel of at least about ±45 degrees. Preferably, the hand wheel 112 has a range of motion of less than about ±90 degrees.

The steering input device 110 also comprises a compact hand wheel 112. Specifically, the hand 112 has a reduced outer dimension, such as, a dimension of about 12 inches.

The steering input device 110 is secured to an instrument panel 184 such that the hand wheel 112 is installed in a non-conventional position in the vehicle.

In a first exemplary embodiment, the non-conventional position comprises the installation of the hand wheel 112 within the exterior dimensions of the instrument panel. Specifically, the instrument panel 184 includes a hand wheel area 185 defined within the exterior dimensions of the instrument panel. The hand wheel 112 is disposed within the hand wheel area 185. In this installed position, the instrument panel 184 extends rearward into the vehicle a distance equal to or farther than the hand wheel 112. Thus, the hand wheel 112 is inside the overall dimensions of the instrument panel 184. In this manner, the hand wheel 112 can be physically integrated into the instrument panel 184.

In order to operate the steering input device 110, the operator reaches past the outside dimension of the instrument panel 184 into the hand wheel area 185 to grasp the hand wheel 112. Then, the operator can move the hand wheel 112 within the area 185 to control the direction of travel of the vehicle.

By physically incorporating the hand wheel 112 into the dimensions of the instrument panel 184, the energy absorbing functions of the vehicle can be enhanced. For example, one or more inflatable occupant restraint devices 186, such as an air bag, can now be placed above, below, and/or around the hand wheel 112. This allows the restraint devices 186 to operate as intended.

The small dimensions and small angle of travel of the hand wheel 112 also enables the steering input device 110 to provide a high range of visibility and accessibility to gauges and controls (not shown) disposed on the instrument panel 184. Further, the small dimensions of the hand wheel 112 can allow removal of the hand wheel when the vehicle is not in use, which could mitigate unauthorized use of the vehicle.

It should be recognized that installation of the steering input device 110 in other non-conventional positions is also contemplated. For example, the steering input device 110 can be mounted on the door of the vehicle for movement between a use and non-use position. In the use position, the hand wheel 112 is presented to the operator, and a non-use position the hand wheel is remote from the operator. Alternatively, the steering input device 110 can be mounted such that the hand wheel extends either above or below the instrument panel.

It is also contemplated for the steering input device 110 to be mounted in between two front seats of the vehicle. Specifically, the steering input device 110 can be mounted between two front seats either on the instrument panel 184 or on the floor. Again, the hand wheel 112 can be configured for movement between a use position and a non-use position. Here, it is also contemplated for the use position to include movement for presentation to the operator for use at either the left hand side or the right hand side of the vehicle. This would allow the vehicle to be easily converted between a "left hand" and a "right hand" drive vehicle.

The small dimensions and small angle of travel of the hand wheel 112 also allow multiple steering input devices 110 to be installed in the same vehicle. For example, the steering input device 110 can be installed at each of the front occupant positions. Thus, the vehicle has two steering input devices 110, one at each front seating position. In this way, the vehicle can be used as either a "left hand" or a "right hand" drive vehicle. In this embodiment, both of the steering input devices communicate signals indicative of the position of their respective hand wheels to the electronic control unit. The electronic control unit is configured to activate the actuator to control the position of the steering output device based upon input from either of the steering input devices. For example, a selector switch can be included on the instrument panel. The selector switch informs the control unit as to which of the steering input devices is currently selected. The electronic control unit then activates the actuator to control the position of the steering output device based upon input from the selected steering input device.

A plurality of bearings 134 rotatably support the upper shaft 114 in a first housing 132. A plate-spring 136 produces a preload force on the bearings 134 along the axis of the upper shaft 114. The preload force eliminates lash and/or axial movement in the bearings 134 and helps to maintain the bearings in position. Accordingly, the plate-spring 136 provides the steering input devices 110 with a hand wheel 112 that is substantially free of lash.

The upper shaft 114 is operatively connected to a lower shaft 138. The connection between the upper shaft 114 and the lower shaft 138 comprises a splined connection 140, a needle bearing 142, and a torque sensor 116 having a torsion bar 144. The splined connection 140 allows backlash between the upper and lower shafts of about ±10 degrees. Namely, the upper shaft 114 is rotatable with respect to the lower shaft 138 by about ±10 degrees before the spline connection engages to cause the lower shaft to rotate. However, the movement of the lower shaft 138 by more than ±10 degrees will also cause the upper shaft 114 to move.

The sensor 116 is configured to detect movement of the upper and lower shafts with respect to one another. Namely, the first sensor 116 detects the torque applied to the hand wheel 112, which twists or deflects the torsion bar 144. The sensor 116 provides a signal to the electronic control unit. The electronic control unit activates the road wheel actuator to control the position of the steering output device by means of, for example, an articulated mechanical linkage such as a tie-rod.

The lower shaft 138 is operatively connected to an electric motor 146 by way of a planetary gear reducer 148 and third sensors 150. The planetary gear reducer 148 is configured to reduce the range of motion of between the electric motor 146 and the hand wheel 112. For example, where the gear reducer 148 has a ratio of 12:1 the electric motor 146 rotates about ±540 degrees while the hand wheel 112 rotates about ±45 degrees. The planetary gear reducer 148 also allows the electric motor 146 to be smaller, and thus generate less torque.

The third sensors 150 have a range of motion of about 1.5 turns in either direction (e.g., ±540 degrees) and are configured to detect the movement of the lower shaft 138. The third sensors 150 can be, by way of example only, a film type sensor, a piezoelectric sensor, and the like.

The first sensor 116 is configured to supply the position of the upper shaft 114 to a control unit of a steer-by-wire system. Similarly, the third sensors 150 are also configured to supply the position of the lower shaft 138 to a control unit of a steer-by-wire system. The control unit, based on the position of the input from the sensors 116 and 150, controls the position of the steering output device. For example, the control unit can activate an electric motor based on the position of the input from the sensors 116 and 150 to adjust the position of the steering output device. Of course, it is contemplated for the control unit to control the position of the steering output device by other means.

The motor 146 is configured to provide one or more of an "active steering" feature, a "road feel" feature, and/or a "center feel" to the steering input device 110. For example, the motor 146 is operatively connected to the electronic control unit. Thus, the control unit can activate the motor 146 to move the lower shaft 138, and/or provide a resistance to the movement of the lower shaft.

The active steering feature allows the control unit of a steer-by-wire system to control the direction of the road wheels without input from the steering input device 110 by the operator. Namely, the control unit actively steers the vehicle without operator input. For example, the vehicle can include sensors to detect vehicle conditions, such as a yaw force. The control unit can be configured to activate the motor 146 to move the lower shaft 138 and/or the upper shaft 114 in response to the sensed conditions. The movement of the lower shaft 138 and/or the upper shaft 114 is detected by the sensors 116 and 150. The control unit, based on the position of the input from the sensors 116 and 150, controls the position of a steering output device.

The "road feel" feature allows the control unit of a steer-by-wire system to apply forces on the hand wheel 112 indicative of the forces imparted on the road wheels during normal driving. For example, during normal driving imperfections in the road surface can exert forces on the road wheels. The road wheels can also include a sensor (not shown) configured to detect these forces. The sensor can provide signals to the control unit indicative of such road forces. The control unit activates the motor 146 to move the lower shaft 138 and/or the upper shaft 114 in a direction and magnitude corresponding to the detected road forces. The movement of the lower shaft 138 and/or the upper shaft 114 is transmitted to the hand wheel 112 to provide the operator with a selected amount of "road feel".

Additionally, the electronic control unit compares and synchronizes the movement of the lower shaft 138 detected by the third sensors 150 and the movement detected by the second sensor. The electronic control unit activates the electric motor 146 based on the inputs from the second and third sensors. Thus, the electric motor 146 is controlled to provide "road feel" (e.g., simulate vibration) to the hand wheel 112 through the synchronization of the signals from the second and third sensors.

The "center feel" is the feeling that the hand wheel is normally biased to its center position. For example, an operator applies a force to the hand wheel to turn the road wheels of the vehicle during normal driving. In vehicles having mechanical steering systems, the force applied by the operator to the hand wheel is typically proportional to the amount or degree of vehicle turn desired. Namely, in order to turn the vehicle slightly, only a slight force is applied to the hand wheel. Conversely, in order to turn the vehicle sharply, a large force is applied. Upon release of the hand wheel in a mechanical system, the operator typically expects the hand wheel to return to its center position after release. Thus, the hand wheel in mechanically linked systems is normally biased to its center position. Thus, the hand wheel of mechanically linked systems have a "center feel".

In order to provide a "center feel" to the hand wheel 112 in the steer-by-wire system, the control unit detects via the sensors 116 and 150 that the operator has moved the hand wheel 112 from its center position. At this point, the control unit activates the motor 146 to apply a force to the lower shaft 138 and/or the upper shaft 114, and thus to the hand wheel 112. The force applied by the motor 146 has a direction that is opposite the force applied by the operator. Thus, the force applied by the motor 146 provides a center feel to the hand wheel 112. In this way, the motor 146 provides a road feel or steering resistance on the hand wheel 112 to simulate a mechanically linked system.

When the operator releases the hand wheel 112, the force applied by the motor 146 returns the hand wheel 112 back to its center position. Once the motor 146 returns the hand wheel 112 to its center position, the control unit deactivates the motor. Accordingly, the hand wheel 112 of the input device 110 is normally biased to its center position.

The force applied by the motor 146 resists the movement of the hand wheel 112 by the operator. Since the control unit controls the force applied by the motor 146, the steering input device 110 can be tuned to control the force in a desired manner. Specifically, the control unit can be configured to vary the strength of the force applied by the motor 146 on the hand wheel 112.

For example, the force applied by the motor 146 can be scaled to the degree of rotation of the hand wheel 112 and/or can be varied according to the speed with which the hand wheel is turned. Thus, the feedback that the operator receives through the hand wheel 112 can be tuned to a level as would be expected to be in a mechanically linked system.

The steering input device 110 can also includes other means to supplement and/or replace the use of the motor 146. In an exemplary embodiment, the steering input device 110 further comprises a simulator mechanism 152 operatively connected to the upper shaft 114. Of course, it should be recognized that the similar mechanism 152 can alternately be operatively coupled to the lower shaft 138. The simulator mechanism 152 is configured to provide at least a part of the "center feel" feature to the steering input device 110.

Figure 3:
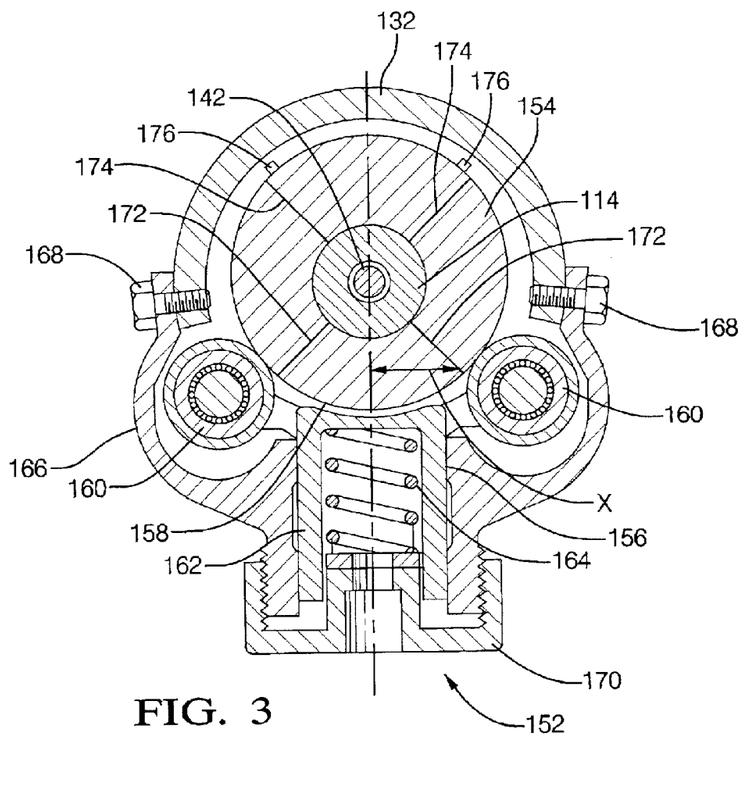
FIG. 3 is a view the steering input device of FIG. 2 along lines 3—3.

Referring now to FIG. 3, the simulator mechanism 152 comprises a cam 154 and a cam following member 156. The cam 154 is fixedly engaged on the upper shaft 114 and has a cam face 158 defined thereon. The cam following member 156 comprises a pair of cam followers 160, a riser 162, and a biasing member 164. The cam following member 156 is within a second housing 166. Bolts 168 secure the second housing 166 to the first housing 132.

Here, the cam followers 160 are rotatably mounted on the riser 162 and the riser 162 is slidably retained in the second housing 166. Namely, the riser 162 is retained in the second housing 166 such that the riser is adapted to move radially toward and away from the cam face 158. The biasing member 164 exerts a spring force (Fo) on the riser 162 to bias the riser toward the cam face 158.

A cap 170 retains the biasing member 164 in the second housing 166. The cap 170 is threadably secured to the second housing 166. Thus, the force (Fo) with which the biasing member 164 urges the riser 162 toward the cam face 158 can be increased/decreased by tightening/loosening the cap 170.

The cam face 158 is configured to translate the spring force (Fo) of the biasing member 164 into a returning torque (Tr) on the upper shaft 114. Namely, movement of the hand wheel 112 moves the upper shaft 114, which in turn moves the cam 154. As cam 154 moves, the cam followers 160 ride along the cam face 158.

The radius of the cam face 158 increases as the cam 154 is moved from the center position. For example, the cam face 158 has a first radius 172 and a second radius 174. The first radius 172 defines the center position of the steering input device 112, and the second radius 174 defines the end position (e.g., full right or full left) of the steering input device. Here, the second radius 174 is larger than the first radius 172. In an exemplary embodiment, the change in the radius between the first radius 172 and the second radius 174 is linear.

As the cam followers 160 ride along the cam face 158, the increasing radius of the cam face acts on the cam followers 160 to slide the riser 162 away from the cam face. This further compresses the biasing member 164, which increases the spring force (Fo) exerted by the biasing member on the riser 162.

Since the riser 162 has slid away from the cam face 158, only one of the cam followers 160 remains engaged with the cam face. Specifically, the cam follower 160 in the direction of the rotation of the cam 154 remains in contact with the cam face. However, the cam follower 160 opposite the direction of the rotation of the cam 154 is no longer in contact with the cam face because the riser 162 has slid away from the cam face 158.

Here, the spring forces (Fo) of the biasing member 164 are applied only at the cam follower 160 in contact with the cam face 158, which generates the returning torque (Tr) on the cam 154. Namely, the returning torque (Tr) is equal to the spring force (Fo) of the biasing member 164 multiplied by the distance (X) the spring force is applied from the center of the rotation of the upper shaft 114 (e.g., Tr=Fo*X). In the center position, the returning torque (Tr) is equal to zero because both cam followers 160 are in contact with the cam face 158. In this position, the returning torque (Tr) applied by each of the cam followers 160 are substantially equal and opposite to one another another.

As provided above, the cam face 158 has a radius that increases from the first radius 172 to the second radius 174. Thus, the spring force (Fo) of the biasing member 164 increases as the cam followers 160 move along the cam face 158. This causes a corresponding increase in the retuning torque (Tr) as the hand wheel 112 is moved away from its center position.

Thus, the cam face 158 provides a variable return torque (Tr) to the steering input device 110 depending upon the degree of the movement of the hand wheel 112.

Accordingly, the simulator mechanism 152 is configured to generate a returning torque (Tr) on the steering input device 110. The returning torque (Tr) provides the steering input device 110 with the tendency to return and keep the hand wheel 112 in its center position. Additionally, the simulator mechanism 152 is configured to provide the steering input device 110 with a feel that more closely mimics that of a mechanical steering system by increasing the returning torque (Tr) as the hand wheel 112 is moved from the center position.

In this manner, the simulator mechanism 152 reduces the usage of the motor 146 by providing at least a portion of the "center feel" to the steering input device 110.

The simulator mechanism 152, when used in combination with the splined connection 140, is further configured to reduce the usage of the motor 146. As discussed above, the splined connection 140 allows backlash between the upper and lower shafts of about ±10 degrees. Thus, the upper shaft 114 is rotatable with respect to the lower shaft 138 by about ±10 degrees. Accordingly, during movement of the hand wheel 112 of less than about 10 degrees, the motor 146 does not require activation to provide the center feel. Here, the simulator mechanism 152 works exclusively in the first 10 degrees of movement of the hand wheel 112, and works in conjunction with the motor 146 during movement of the hand wheel over 10 degrees.

In an alternate exemplary embodiment, the simulator mechanism 152 is also configured to provide a mechanical stop to the steering input device 110. Here, the cam face 158 further comprises an interference device 176. The interference device 176 is configured to interact with the cam followers 160 to prevent the followers from moving along the cam face beyond the interference device 176. Thus, the interference device 176 prevents the cam 154 from being rotated beyond a selected point by, such as the second radius 174. In this manner, the simulator mechanism 152 provides the steering input device 110 with a mechanical stop, which mimics the mechanical stop of mechanical steering systems.

Accordingly, the steering input device 110 is configured to mimic certain responses as would be expected from a mechanically linked system.

The steering input device 110 can also be configured to allow the operator to adjust the hand wheel in a vertical direction (e.g., rake) and in the longitudinal direction (e.g., telescoping). For example, the steering input device can include a pivoting connection (not shown) on the upper shaft 114 to allow the operator to adjust the position of the hand wheel 112.

Further, the steering input device can also comprise energy absorbing functions for absorbing energy. For example, the upper shaft 114 can be secured to the vehicle by brackets (not shown) configured to release at a selected energy load.

Figure 4:
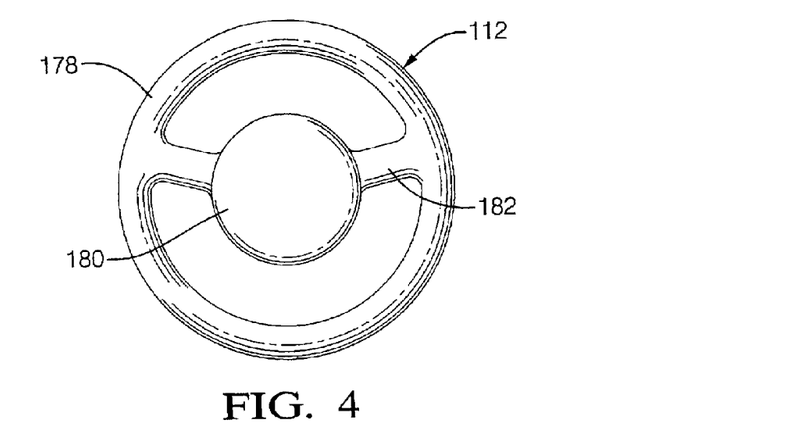
FIG. 4 is a front view of the hand wheel of FIG. 2.

Turning now to FIG. 4, a front view of the hand wheel 112 is illustrated. Here, the hand wheel 112 has a circular gripping rim 178 supported on a central hub 180 by a plurality of spokes 182. The central hub 180 is configured for attachment to the upper end of the upper shaft 114. The hand wheel 112 has an outer dimension of about 12 inches, which is smaller than hand wheels of mechanical systems.

Here, the hand wheel 112 allows the operator to support themselves in the event of inertial forces, without adding undesired inputs to the steering input device 110.

Referring now to FIGS. 5-8, various alternate exemplary embodiments of a hand wheel for use with a steering input device is illustrated.

Figure 5:
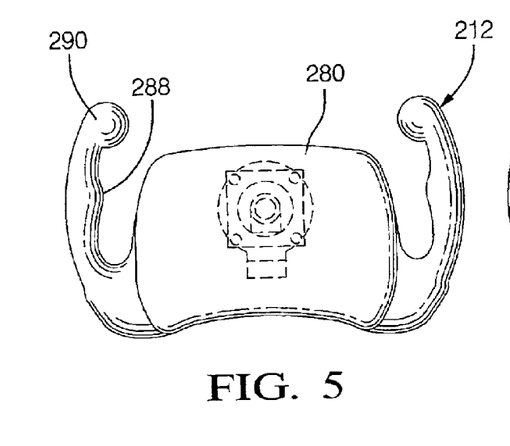
FIGS. 5–8 are front views of various alternate exemplary embodiments of a hand wheel for use with a steering input device.

In FIG. 5, a first exemplary embodiment of a hand wheel 212 is illustrated. The hand wheel 212 comprises a central hub 280 configured for attachment to the upper shaft. The central hub 280 further comprises a pair of handgrips 288. In this embodiment, the handgrips 288 depend from the central hub 280 such that a free distal end 290 is defined.

Figure 6:
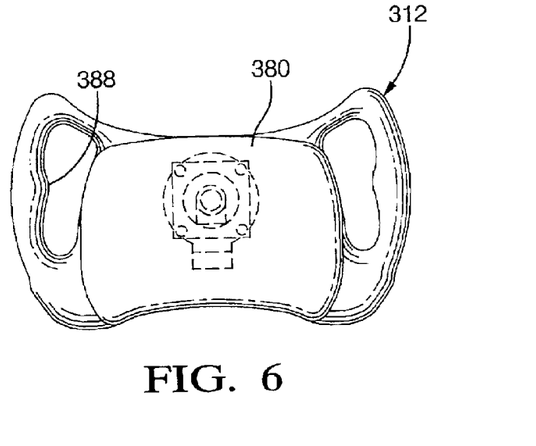

An alternate exemplary embodiment of a hand wheel 312 is illustrated in FIG. 6. Again, the hand wheel 312 comprises a central hub 380 configured for attachment to the upper shaft, and a pair of handgrips 388. In this embodiment, the handgrips 388 depend from the central hub 380 in a generally u-shaped manner.

Figure 7:
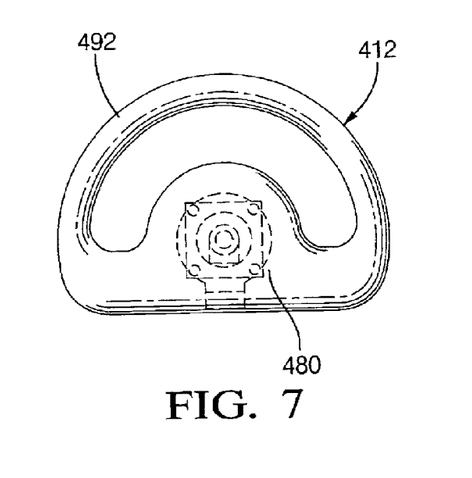

Another alternate exemplary embodiment of a hand wheel 412 is illustrated in FIG. 7. As before, the hand wheel 412 comprises a central hub 480 configured for attachment to the upper shaft. In this embodiment, a semi-circular handgripping ring 492 depends upwardly and radially outwardly from the central hub 480.

Figure 8:
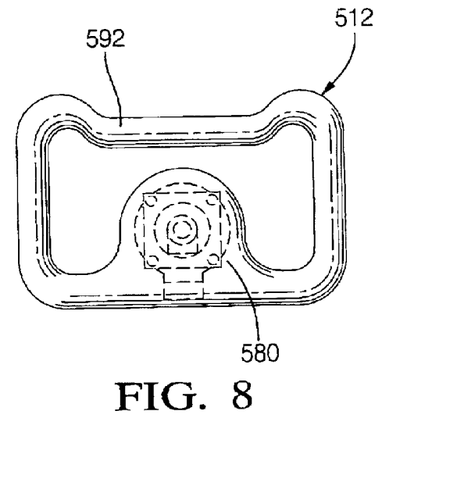

In FIG. 8, yet another alternate exemplary embodiment of a hand wheel 512 is illustrated. The hand wheel 512 comprises a central hub 580 configured for attachment to the upper shaft. In this embodiment, a generally rectangular gripping member 592 depends upwardly and outwardly from the central hub 580.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to one or more an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering input device for a steer-by-wire system, comprising:

a first shaft of a steer by wire system being rotatably installed in a first housing of the steer by wire system; and a hand wheel of the steer by wire system connected to said first shaft such that said hand wheel and said first shaft drive one another, said hand wheel and said first shaft being rotatable in a in a range of motion of at least about ±45 degrees, but less than about ±90 degrees, said hand wheel having an outer dimension of about 12 inches, said angle of travel and said outer dimension being configured such that said steering input device is installable in a vehicle having a steer-by wire system.

2. The steering input device as in claim 1, wherein said hand wheel being disposed in an instrument panel area defined in an instrument panel of said vehicle, said instrument panel extending rearward in said vehicle a distance equal to or farther than said hand wheel.

3. The steering input device as in claim 2, wherein said instrument panel comprises means for absorbing energy.

4. The steering input device as in claim 3, wherein said energy absorbing means comprises one or more inflatable occupant restraint devices disposed in said instrument panel in a position selected from the group consisting of above, below, and around said hand wheel.

5. The steering input device as in claim 2, further comprising:

a simulator mechanism operatively connected to said first shaft, said simulator mechanism being configured to provide at least a portion of a center feel feature to said steering input device.

6. The steering input device as in claim 1, wherein said steering input device being mountable on a door of said vehicle, said steering input device being configured such that said hand wheel is movable between a use and non-use position.

7. The steering input device as in claim 1, wherein said steering input device being mountable between front seats of said vehicle, said steering input device being configured such that said hand wheel is movable between a use and non-use position.

8. The steering input device as in claim 7, wherein said steering input device is mountable in an instrument panel between said front seats, or on a floor of said vehicle between said front seats.

9. The steering input device as in claim 7, wherein said use position comprises a first use position and a second use position.

10. The steering input device as in claim 1, wherein said range of motion and said outer dimension are further configured such that said steering input device is installable in said vehicle in more than one location.

11. The steering input device as in claim 1, further comprising:
a spline connection operatively connecting said first shaft to a second shaft, said spline connection allowing a selected amount of movement between said first and second shafts prior to said spline connection engaging such that said first and second shafts drive one another.

12. The steering input device as in claim 11, further comprising:
a first sensor configured to detect movement of said first and second shafts with respect to one another;
a motor connected to said second shaft, said motor being configured to at least one of drive said second shaft, and said motor being configured to provide a resistance to movement of said second shaft; and
a second sensor configured to detect movement of said second shaft, wherein said first sensor, said motor, and said second sensor are in electrical communication with an electronic control unit.

13. The steering input device as in claim 12, wherein said motor is controllable by said electronic control unit to provide at least one of an active steering feature, a road feel feature, and a portion of a center feel to said steering input device.

14. A steer-by-wire steering system for a vehicle, comprising:
a steering output device of a steer by wire system;
an actuator of the steer by wire system;
a first steering input device of the steer by wire system including a first hand wheel and a first plurality of sensors, said first hand wheel being disposed in a first hand wheel area defined in an instrument panel of said vehicle such that said instrument panel extends rearward in said vehicle a distance equal to or farther than said first hand wheel, said first hand wheel having a range of motion of at least about ±45 degrees but less than about ±90 degrees, said first plurality of sensors being configured to generate first signals representative of a position of said first hand wheel; and
an electronic control unit in electrical communication with said actuator, said first plurality of sensors, and said steering output device, wherein said electronic control is configured to activate said actuator to control the position of said steering output device based upon said first signals from said first plurality of sensors; and
said first hand wheel being structured to be moveable between a use and a non use position.

15. The steer-by-wire steering system as in claim 14, wherein said first hand wheel has an outer dimension of about 12 inches.

16. The steer-by-wire steering system as in claim 14, wherein said instrument panel further comprises:
an inflatable occupant restraint device being positioned in said instrument panel in a position selected from the group consisting of above said first hand wheel, below said first hand wheel, and around said first hand wheel.

17. The steer-by-wire steering system as in claim 14, wherein said first steering input device further comprises:
a motor in electrical communication with said electronic control unit, said motor being configured to provide at least one of an active steering feature, a road feel feature, and a portion of a center feel to said first steering input device.

18. The steer-by-wire steering system as in claim 14, further comprising:
a second steering input device including a second hand wheel and a second plurality of sensors,
said second hand wheel being disposed in a second hand wheel area defined in said instrument panel of said vehicle such that said instrument panel extends rearward in said vehicle a distance equal to or farther than said second hand wheel,
said second plurality of sensors being configured to generate second signals representative of a position of said second hand wheel,
said electronic control unit being in electrical communication with said second plurality of sensors, and
said electronic control unit being configured to activate said actuator to control the position of said steering output device based upon either said second signals or said first signals.

19. The steer-by-wire steering system as in claim 18, wherein said instrument panel further comprises:
an inflatable occupant restraint device being positioned in said instrument panel in a position selected from the group consisting of above said second hand wheel, below said second hand wheel, and around said second hand wheel.

20. A method of steering a vehicle, comprising:
reaching into a hand wheel of a steer by wire system defined within an instrument panel of said vehicle;
grasping a hand wheel of the steer by wire system disposed in said hand wheel area, said hand wheel being disposed in said hand wheel area such that said instrument panel extends rearward in said vehicle a distance equal to or farther than an entire portion defining said hand wheel;
moving said hand wheel to steer by wire system to steer said vehicle, wherein said hand wheel has a range of motion of a least about ±45 degrees but less than about ±90 degrees; and
moving said hand wheel between a use and a non use position.

21. The method of claim 20, wherein said hand wheel is inside overall dimensions defining said instrument panel.

22. The steering input device as in claim 2, wherein said hand wheel is inside overall dimensions defining said instrument panel.

* * * * *